Sept. 3, 1940.                C. J. ROHLAND                2,213,568
                               PRINTING PLATE
                             Filed April 2, 1937
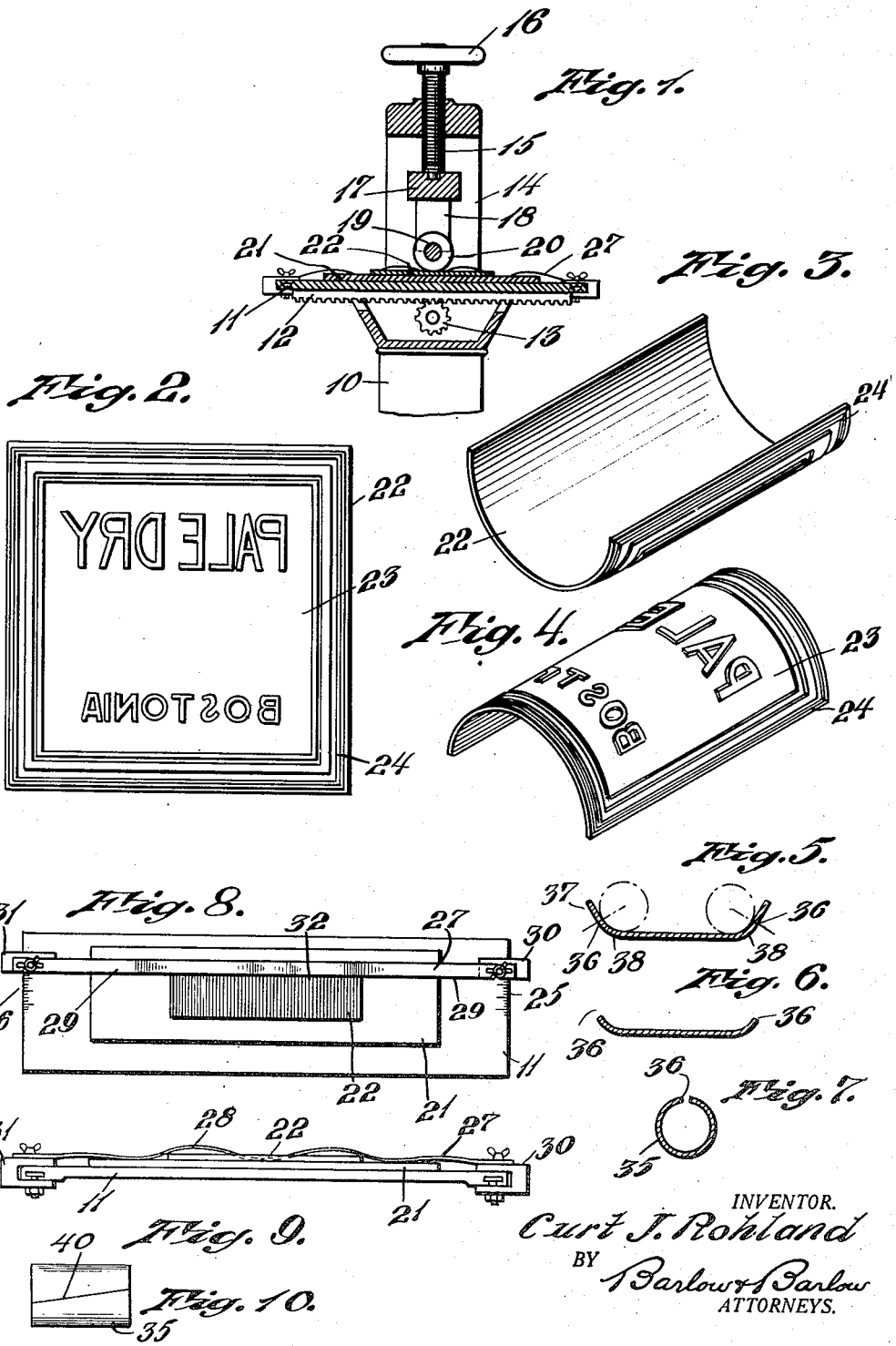
INVENTOR.
Curt J. Rohland
BY Barlow & Barlow
ATTORNEYS.

Patented Sept. 3, 1940

2,213,568

UNITED STATES PATENT OFFICE 2,213,568

PRINTING PLATE

Curt J. Rohland, Seekonk, Mass., assignor to Paul-Rohland, Inc., a corporation of Rhode Island Application April 2, 1937, Serial No. 134,562

8 Claims. (Cl. 101—401.2)

This invention relates to the formation of steel cylindrical or arcuate printing plates and has for one of its objects the provision of a curved surface in steel which has been etched in a flat plate prior to its curved formation.

Another object of the invention is the formation of a cutting edge while the plate is in flat form and then bending the plate into arcuate shape.

Another object of this invention is a method of supporting fine print lines or cutting edges during the curving or bending process of the steel plate, so that fine print lines which ordinarily would break or rupture under stresses or strains existent in bending or curving the surface will remain intact and supported against any such rupture, and thus will be permitted to be used where stresses are set up which are stronger in the bending of the plate to position than the ordinary strength of the print line.

Another object of the invention is the provision of a machine or apparatus in which the pressure may be progressively applied along different short sections of the plate for accomplishing bending.

Another object of the invention is an arrangement in the machine whereby the cutting line of the plate will be in a plane at a slight angle to the axis of the arc upon which it is bent, which is desirable for application to a plate having combined cutting, embossing and printing, arranged for fancy labels and belt production.

With these and other objects in view, the invention consists of certain novel features of construction, as will be more fully described, and particularly pointed out in the appended claims.

In the accompanying drawing:

Fig. 1 is a sectional view showing generally diagrammatically the relation of the parts and work in accomplishing this process;

Fig. 2 is a top plan view of the plate which has been etched and in flat form prior to bending;

Fig. 3 is a perspective view of the back of the plate after being curved;

Fig. 4 is a perspective view of the front of the plate after being bent to curved form;

Figs. 5, 6 and 7 are diagrammatical views showing the work in section illustrating steps necessary in forming a printing surface in a complete hoop or circle;

Fig. 8 is a top plan view of the table with the work mounted thereon; and

Fig. 9 is a side elevation of the same on a somewhat enlarged scale from that shown in Fig. 1.

Fig. 10 is an elevation of a completely cylindrical plate with angularly related abutted edges.

Printing cylinders of steel are now usually formed by engraving on the curved cylindrical steel surface, or in soft materials by molding. The engraving of the steel cylinder is one requiring great skill and the subject of the engraving is limited as to certain fine lines that may be performed. In the molding in the softer metal the plate wears out quickly and is good only for very short runs. Further cutting edges cannot be formed in such soft metal. Where curved surfaces have been heretofore used which could not be performed by engraving, copper plates have been etched and afterwards formed into curved form. The thickness of the copper was limited to about sixteen thousandths of an inch as a heavier gauge plate would buckle when strapped about a cylinder whose diameter was below three inches. Thus with such a thin plate hardly any embossing was possible and further the copper being a soft material did not stand up in use, rather wearing out very fast. Thus this difficulty was encountered in the use of etching where curved plates were used, which etching was necessary to obtain effects not possible by engraving or molding. Any attempts heretofore to etch and afterward bend a steel plate have been unsuccessful due to the stresses set up in the fine print lines which would become ruptured upon bending, and in order to provide an etched steel plate on the arc of a cylinder I have supported the fine lines in the etched surface by a soft backing, usually of thick rubber to form a cushion, while operating on the back of the plate to form it into a curved or arc shaped formation, whereby I support the fine print lines as the cylinder is bent and thus do not disturb or rupture these print lines, maintaining them in their proper true desired relation in the curved formation, and the following is a more detailed description of the present embodiment of this invention, illustrating the preferred means by which these advantageous results may be accomplished:

With reference to the drawing, I have illustrated in Fig. 1, somewhat diagrammatically, the base portion 10, of an apparatus which has a table 11, reciprocally mounted thereon, reciprocation of the table being afforded by means of a rack 12 on the under side thereof, meshing with the gear 13, rotatably mounted on the base 10.

The structure above the table consists of a standard 14 in which a threaded member 15 is mounted to be moved downwardly by some suitable rotative means such as a hand wheel 16. Swivelly attached to the lower end of the threaded member 15 is a block 17, having downwardly extending or fork shaped portions 18 to receive in the inverted U shaped recess 19 the trunnions of the forming roll or mantle 20.

A deep rubber cushion or anvil 21 is fixedly mounted upon the table 11 and supports the work plate 22 shown in Fig. 1 in flat condition. This plate 22 is of steel and is etched on one side to provide the desired design as 23 in Fig. 2, the same being carried out in a known manner while the plate is in flat formation. The work is also provided with cutting edges 24 for severing the paper as the printing occurs. It is found in the use of cutting edges on printing plates of this character that if the cutting edges are in a plane at right angles to the axis of the cylinder that they will cut into the resilient backing up mat for the work and rather quickly destroy the same, whereas, if this cutting is done at a slight angle to that of a perpendicular plane passing through the axis of a cylinder that the lines of cuts will be sufficiently staggered so that the mat will last a great deal longer.

In laying out the work it is essential that the work be properly aligned with reference to the axis of the plate when mounted upon the printing mandrel and in order that this slight angle may truly and accurately occur I have provided the plate 11 with indications 25 and 26 at either end of the table which are carefully laid out to precision with relation to the axis of the bending mandrel 20, and I provide a strip 27 of material which is resilient and has a somewhat wavy form with crest portions 28. The edge 29 of this strip is positioned to be engaged by the work 22, the cutting line of which is parallel to the edge of the work. The ends of this strip are secured in clamps 30 and 31 which may be set with relation to the markings 25 and 26 so that this strip may have a desired angle whereby the edge 32 of the work will abut the edge of this strip 29 which extends over or on top of the soft anvil or backing 21 so as to properly align the work with relation to the axis of the mandrel and position the cutting line at the desired angle. Although this strip 29 is somewhat wavy in one direction so as to present a greater edge engaging surface for thin work stock, it is not bendable or flexible in its other dimensions and accordingly serves to properly align the work. Further, by reason of its flexibility or resiliency it is capable of being curved about the mandrel as the work is bent and will properly conform to the desired shape of the work as pressure is applied.

This plate is laid with its etched surface against the rubber anvil 21, and pressure is applied to the plate through the roll or mantle 20. The etched surface is forced into the rubber anvil while the pressure tends to bend the plate about the roll 20, only on a somewhat greater arc than the arc of the roll 20. After bending is accomplished along the line of contact of the roll with the work, the table is moved so as to present a different portion or section of the work closely adjacent to that just bent by the roller 20, and the pressure will then cause a bending in this section and so on progressively the bending of the work takes place while supported in this deep rubber cushion or anvil 21, which gives support to the fine lines against the stresses set up so as to prevent the rupture of these lines. Where greater support is desired than is afforded by the rubber, an anvil of lead may be used and by its use thicker work plates may be bent.

In all cases the printing plate must have margins beyond the printing area at both sides and ends, the amount being dependent upon the diameter to be provided, but where the printing surface is to be a complete cylinder such as illustrated at 35 in Fig. 7, a greater amount of stock must be provided on the plate beyond the ends 36 of the drum cylinder. Such stock is designated 37, and the first operation in forming such a hoop or cylinder complete is to press the stock adjacent the ends so as to form the opposite ends curved as illustrated in Fig. 5, it requiring stock beyond the tip ends 36 in order to provide this curved formation for the finished product. After these ends are curved as at 38, the stock 37 beyond the printing surface is severed, leaving the ends 36 and the material in the shape shown in Fig. 6, after which the bending operation is completed as shown in Fig. 7 and its ends are so shaped as to truly abut for the completion of the design and to provide a complete cylinder. This abutting may take place on an angle to the axis if desired, as shown at 40 in Fig. 10, so that a doctor blade will not catch in the crevice. A slight touching up operation may be needed in some cases at the abutting ends.

To prevent distortions in bending I allow a margin of one-quarter of an inch or more on each side of the design, this materially holding the etched-away surface in true relation to the back of the plate. In other words, the thin places cannot buckle as the rubber cushion together with the marginal edges supports the bending precisely the same as if no etched-away surfaces existed.

Owing to the bending, the plate stretches in the curved direction, this will have to be considered in preparing the design. I have found that the thickness of the plate, the radius of the curve, and the material to be used are the essential considerations. Accordingly, the design is reduced .018 of an inch for each inch in point surface circumference, in length only. As an example, a design photographed and etched 13.318 inches in length will give a print cylinder of 4.317 diameter, or print line 13.562, which will be the final result and will print and repeat every 13.562 to register.

This aforesaid explanation applies particularly to the so-called letter press printing. The same plate construction applies to the "Rotogravure" work as well. The only difference is in the photographing and etching the plate for this "Rotogravure" purpose. Instead of the letters or designs being etched into the plate and the ink staying in the etched surfaces, the doctor plate wipes all surfaces clean of ink. The plate joint is fitted with a cylinder so that the doctor plate cannot drop in the crevice at any one point. If an angle abutment is not used this crevice is plugged with a bismuth solder or gum so that no ink remains in the splice. I no longer need to work with carbon tissue in etching. Also it is not necessary to make up costly copper laminated cylinders and to tear the design off or store the cylinder away, because the plate can now be prepared in one-sixteenth of an inch thickness in copper, steel or any other suitable material. The work can be photographed and etched in a flat condition and then formed or curved. The curving plate can be slipped on a holder which is a part of the press and the joint fixed as above described.

A pressure of a given amount may be applied to the rear surface of the work while traversing the work back and forth beneath the pressure roller 20 by engaging it progressively, as heretofore indicated, and so on until the desired arc has been provided, and then greater pressure may be applied. The pressure mandrel is on an arc of lesser radius than that caused to be formed in the work. For instance, if I wish to have a cylindrical arcuate plate of substantially three inches diameter the roll or mantle 20 would be of two and three-quarters inch diameter, if the cylinder be desired to be five inches the roll would be four and three-sixteenths inches in diameter, or in each case the roll about which the work is bent will be of a lesser diameter than the finished inside arc of the plate being operated upon. The figures above given being one set which have been found applicable to a certain hardness of printing plate which I have used.

The pressure applied will usually be hydraulic and will for ordinary printing plates of the dimensions given be in the neighborhood of five hundred pounds per square inch.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. The method of forming a printing cylinder comprising etching a steel plate while in flat form and then bending said plate into arcuate shape on a curvature extending from end to end in the finished plate by applying pressure on the back of the plate while the etched face is in contact with a material sufficiently soft to receive into its surface the relief portions of the etched face so as to support the print lines in many directions against rupture, and removing the pressure prior to relatively advancing a portion of the plate to the pressure applying means.

2. The method of forming a printing cylinder comprising etching a steel plate while in flat form and then bending said plate into arcuate shape in short sections on a curvature extending from end to end in the finished plate by applying pressure to the back of the plate intermittently while the etched face is in contact with a rubber cushion sufficiently soft so as to receive and support the print line in many directions against rupture.

3. The method of forming a printing cylinder comprising etching a steel plate while in flat form and then bending said plate into arcuate shape in short sections on a curvature extending from end to end in the finished plate by applying pressure to the back of the plate while the etched face is in contact with a lead anvil sufficiently soft so as to receive and support the print line in many directions against rupture.

4. The method of forming a printing cylinder comprising etching a steel plate while in flat form and then bending said plate into arcuate shape in short sections progressively on a curvature which will extend from end to end in the finished plate by applying pressure to the back of the plate while the etched face is in contact with a deep rubber cushion held upon a flat surface and acting as an anvil and sufficiently soft so as to receive and support the print line in many directions against rupture.

5. The method of forming a printing cylinder comprising etching a steel plate while in flat form and then bending said plate into arcuate shape on a curvature which will extend from end to end in the finished plate by applying pressure to the back of the plate while the etched face is in contact with a material sufficiently soft so as to receive and support the print line in many directions against rupture and advancing the work and its supporting material while relieved of pressure.

6. The method of forming a printing cylinder comprising etching a steel plate while in flat form to provide fine print lines therein and then bending said plate into arcuate shape on a curvature which will extend from end to end in the finished plate by applying pressure to the back of the plate intermittently while the etched face is in contact with a material sufficiently soft so as to receive and support the fine print lines in many directions against rupture.

7. The method of forming a printing cylinder comprising etching a steel plate while in flat form to provide print lines and cutting lines therein, then bending said plate into arcuate shape with the cutting lines in a plane passing through the axis of the formed arc at other than a right angle by applying pressure to the back of the plate intermittently while the etched face is in contact with a material sufficiently soft so as to receive and support the fine print lines in many directions against rupture.

8. The method of forming a printing cylinder comprising etching a steel plate while in flat form with waste stock beyond the ends of printing surface to provide print lines, then bending the plate adjacent the ends of the printing surface on a curvature substantially that of the finished printing cylinder, severing the stock beyond the curved portion and completing the bending of the plate into hoop form.

CURT J. ROHLAND.